United States Patent
Thottappilly et al.

(10) Patent No.: US 12,436,892 B2
(45) Date of Patent: *Oct. 7, 2025

(54) PAGE POOL DESCRIPTOR CACHE

(71) Applicant: Apple Inc., Cupertino, CA (US)

(72) Inventors: Arjun Thottappilly, Oviedo, FL (US); Frank W. Liljeros, Sanford, FL (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/761,713

(22) Filed: Jul. 2, 2024

(65) Prior Publication Data

US 2024/0354249 A1 Oct. 24, 2024

Related U.S. Application Data

(63) Continuation of application No. 17/660,094, filed on Apr. 21, 2022, now Pat. No. 12,061,545.

(Continued)

(51) Int. Cl.
*G06F 12/08* (2016.01)
*G06F 12/02* (2006.01)
(Continued)

(52) U.S. Cl.
CPC ........ *G06F 12/0882* (2013.01); *G06F 12/023* (2013.01); *G06F 12/0246* (2013.01);
(Continued)

(58) Field of Classification Search
CPC .............. G06F 12/0882; G06F 12/023; G06F 12/0246; G06F 12/08; G06F 12/02; G06F 12/0806; G06F 12/0871; G06F 2212/6042
See application file for complete search history.

(56) References Cited

U.S. PATENT DOCUMENTS 7,623,134 B1   11/2009  Damlak
8,140,721 B2 *  3/2012  Sachedina ............... G06F 16/22
                                                         715/251

(Continued)

FOREIGN PATENT DOCUMENTS

WO   WO-2019027560 A1 *  2/2019  ........... G06F 9/5016
WO   WO-2021173623 A1 *  9/2021  ........... G06F 12/084

OTHER PUBLICATIONS

W. Powley, P. Martin, N. Ogeer and Wenhu Tian, "Autonomic buffer pool configuration in PostgreSQL," 2005 IEEE International Conference on Systems, Man and Cybernetics, Waikoloa, HI, USA, 2005, pp. 53-58.*

(Continued)

*Primary Examiner* — Pierre Michel Bataille
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to managing page pools for sets of processing work. In some embodiments, page manager circuitry maintains, in memory circuitry, page pool descriptor information that indicates memory pages allocated to multiple different page pools. It may cache page pool descriptor information from the memory circuitry in a page pool descriptor cache, where the page pool descriptor cache includes multiple entries and a given entry is configured to store the following information for a cached page pool descriptor: a location of a corresponding page pool and page pool size information. The page manager circuitry may provide pages to requesting client circuitry from the page pool based on the cached page pool descriptor information.

20 Claims, 12 Drawing Sheets

Related U.S. Application Data

(60) Provisional application No. 63/267,829, filed on Feb. 10, 2022.

(51) Int. Cl.
  *G06F 12/0806* (2016.01)
  *G06F 12/0871* (2016.01)
  *G06F 12/0882* (2016.01)

(52) U.S. Cl.
  CPC ...... *G06F 12/0806* (2013.01); *G06F 12/0871* (2013.01); *G06F 2212/6042* (2013.01)

(56) References Cited

U.S. PATENT DOCUMENTS

| | | | |
|---|---|---|---|
| 9,218,289 | B2 | 12/2015 | Rychlik et al. |
| 9,846,655 | B1 | 12/2017 | Zhao et al. |
| 10,152,449 | B1 * | 12/2018 | Ward, Jr. ............. G06F 15/173 |
| 2007/0260769 | A1 | 11/2007 | Arndt et al. |
| 2011/0161620 | A1 | 6/2011 | Kaminski et al. |
| 2012/0072652 | A1 * | 3/2012 | Celis ................. G06F 12/0893 711/159 |
| 2013/0054920 | A1 | 2/2013 | Sato |
| 2013/0198469 | A1 | 8/2013 | Mizuno |
| 2018/0285262 | A1 | 10/2018 | Trikalinou et al. |
| 2018/0308216 | A1 | 10/2018 | Mirza et al. |
| 2019/0236749 | A1 | 8/2019 | Gould |
| 2019/0243582 | A1 | 8/2019 | Satoyama |
| 2019/0354487 | A1 | 11/2019 | Bahirji |
| 2021/0271606 | A1 * | 9/2021 | Hensley ............. G06F 12/1009 |
| 2022/0050793 | A1 | 2/2022 | Saroiu et al. |
| 2022/0229777 | A1 * | 7/2022 | Shveidel ................. G06F 3/067 |
| 2022/0237119 | A1 | 7/2022 | Han et al. |

OTHER PUBLICATIONS

H. Kim and R. Rajkumar, "Shared-Page Management for Improving the Temporal Isolation of Memory Reservations in Resource Kernels," 2012 IEEE International Conference on Embedded and Real-Time Computing Systems and Applications, Seoul, Korea (South), 2012, pp. 310-319.*

Office Action in U.S. Appl. No. 17/660,148 mailed Apr. 3, 2023, 12 pages.

Office Action in U.S. Appl. No. 17/660,148 mailed Sep. 13, 2023, 13 pages.

D. Dhurjati and V. Adve, "Efficiently Detecting All Dangling Pointer Uses in Production Servers," International Conference on Dependable Systems and Networks (DSN'06), Philadelphia, PA, USA, 2006, pp. 269-280.

Office Action in U.S. Appl. No. 17/660,094 mailed Jul. 20, 2023, 9 pages.

Notice of Allowance in U.S. Appl. No. 17/660,094 mailed Apr. 15, 2024, 5 pages.

* cited by examiner

PAGE POOL DESCRIPTOR CACHE

CROSS-REFERENCE TO RELATED APPLICATIONS

The present application is a continuation of U.S. application Ser. No. 17/660,094, entitled "Memory Page Manager," filed Apr. 21, 2022, which claims priority to U.S. Provisional Appl. No. 63/267,829, entitled "Hardware-assisted Page Pool Grow Operation," filed Feb. 10, 2022.

This application is related to the following U.S. application filed on Apr. 21, 2022: U.S. application Ser. No. 17/660,148 (2888-38101/P55266US1, entitled "Hardware-assisted Page Pool Grow Operation"), now issued as U.S. Pat. No. 12,026,098.

Each of the above-referenced applications is hereby incorporated by reference as if entirely set forth herein.

BACKGROUND

Technical Field

This disclosure relates generally to memory management in computing systems and more particularly to techniques for managing a page pool.

Description of the Related Art

Memory paging is a well-known management scheme used to access a secondary storage element (e.g., a disc drive or solid-state drive) for main memory (e.g., a random-access memory (RAM)). Paging in conjunction with virtual memory allows programs to exceed the size of available physical memory.

Hardware, software, or both may allocate memory for tasks or memory spaces and assign pages to those tasks or memory spaces. A page pool is a data structure that may be used to track assigned pages. Managing page pools in the context of multiple workloads may be challenging. Also, in some situations, the size of the page pool may need to change, e.g., when a program needs more space than currently provided by its page pool.

DETAILED DESCRIPTION

Figure 1A:
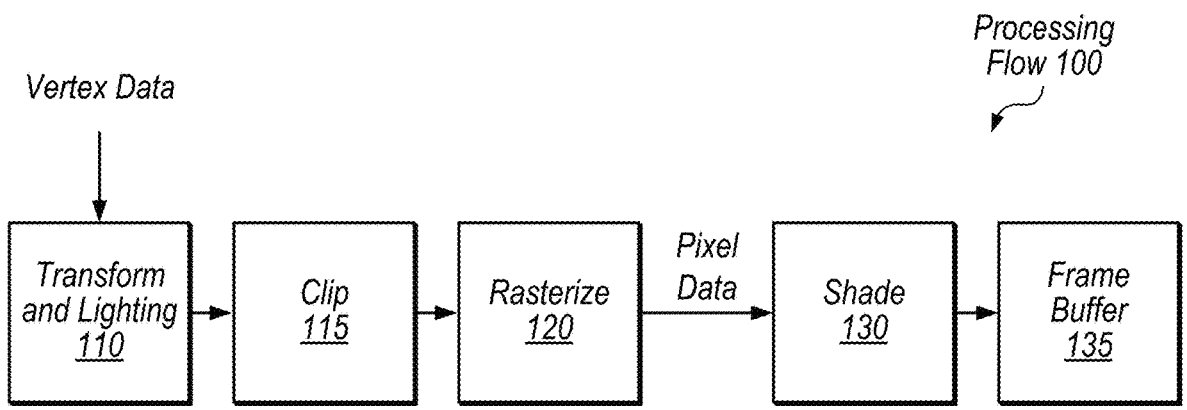
FIG. 1A is a diagram illustrating an overview of example graphics processing operations, according to some embodiments.

In some embodiments, memory allocator circuitry includes page manager circuitry with various functionality described in detail below. The memory allocator circuitry may allocate memory for various spaces in the context of a unified memory architecture, e.g., for a graphics processor. Therefore, the memory allocator may provide memory backing for various types of graphics memory spaces (some of which may be private).

U.S. patent application Ser. No. 16/804,128 filed Feb. 28, 2020 is incorporated by reference herein in its entirety and discusses example memory allocator techniques. For example, the '128 application discusses memory allocator circuitry configured to dynamically map private memory addresses to virtual pages. In some embodiments, the memory allocator includes a memory management unit (MMU) that maintains a page table hierarchy to translate private memory addresses to virtual addresses. In some embodiments, the memory allocator interacts with a page manager (which may include primary and distributed components) that manages pools of pages, from which pages are distributed to MMU page table hierarchies.

The page manager may include primary and distributed components. The primary page manager may interact with software to manage pools of pages while the distributed page managers may work with MMU hierarchies for graphics shader hardware. For example, the primary page manager may map a set of one or more graphics kicks to a given memory pool. The page manager may also cache page table descriptor entries, which may substantially improve performance, particularly when multiple kicks are mapped to the same page pool.

Pages may be reserved from a page pool before the corresponding kick(s) are allowed to launch on the shader hardware. When a shader program ends, the pages may be released back to the page pool (e.g., using dedicated page reserve/release interfaces in some embodiments). Pages may also be allocated to MMU's based on demand (and only reserved pages may be allocated, in some embodiments), and freed when the MMU is done with them. Therefore, in some embodiments, the page manager implements separate reserve/release and allocate/free interfaces. For allocation, the system may use a credit-based mechanism to push virtual pages to MMU hierarchies. The page manager may also interact with one or more data controller units (e.g., a vertex data controller, a pixel data controller, and a compute data controller) to coordinate start-of-kick and end-of-kick activities and to support logical kickslots.

The page manager circuitry may pre-fetch pages to improve performance and pages that are not allocated may be freed at the end of a set of work.

Further, in some embodiments, the system uses hardware assistance to control a page pool grow operation. As discussed in the background section, a page pool may track pages assigned to a memory space (e.g., a private graphics memory space). In some embodiments, a device includes memory allocator circuitry configured to allocate memory for address spaces.

Software, memory allocator circuitry, or both may maintain a page pool descriptor table (PPDT) that includes an entry for each page pool managed, where a given entry indicates the set of pages in a given pool. A given task or memory space may be assigned one or more page pools. For example, a GPU may assign each graphics kick to one or more page pools for execution by associating a given kick with one or more PPDT entries.

The PPDT may be stored in system memory (which may be paged and virtualized) but the memory allocator circuitry may also cache PPDT entries. In some embodiments, when a page pool runs out of pages (or reaches a threshold low level), it initiates an interrupt to inform firmware that a page pool grow operation is needed. The grow operation may traditionally use substantial software management and may have substantial latency when PPDT entries are cached in the memory allocator and need to be written back to memory to be updated.

In disclosed embodiments, hardware helps with the page pool grow operation, in contrast to traditional firmware-managed techniques. In particular, firmware allocates memory for a grow list and populates it with pointers to memory blocks to be added to the page pool, in some embodiments.

Page manager hardware may receive the grow list and add the blocks indicated by the grow list to the cached PPDT entry for that pool, in some embodiments. When it is finished, it sends an interrupt to firmware to complete the grow operation.

In some embodiments, the page manager hardware triggers a signal (e.g., an interrupt) in response to a page pool threshold event (PPTE), such as the number of available pages in a pool falling below a threshold. This may allow software to preemptively initiate a grow operation before the pool is empty.

Disclosed techniques may advantageously reduce or avoid halting a set of work when its page pool needs to grow. Rather, the grow operation may be initiated at a threshold low-page-level for the pool and the set of work can continue to execute in parallel with the grow operation. This may substantially improve performance of the processor, relative to implementations in which firmware might halt a PPDT entry, save the PPDT entry to memory, add pages to the PPDT entry, load the PPDT entry back to the page manager cache, and then resume normal operation.

Note that while various disclosed embodiments relate to the graphics processor context, disclosed techniques may be implemented in other types of processors such as central processing units, firmware processors, microcontrollers, etc. GPU implementations are discussed in detail to facilitate discussion but are not intended to limit the scope of the present disclosure.

Graphics Processing Overview

Referring to FIG. 1A, a flow diagram illustrating an example processing flow 100 for processing graphics data is shown. In some embodiments, transform and lighting procedure 110 may involve processing lighting information for vertices received from an application based on defined light source locations, reflectance, etc., assembling the vertices into polygons (e.g., triangles), and transforming the polygons to the correct size and orientation based on position in a three-dimensional space. Clip procedure 115 may involve discarding polygons or vertices that fall outside of a viewable area. Rasterize procedure 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer), ignoring one or more fragments (e.g., if they are covered by other objects), or both. Shade procedure 130 may involve altering pixel components based on lighting, shadows, bump mapping, translucency, etc. Shaded pixels may be assembled in a frame buffer 135. Modern GPUs typically include programmable shaders that allow customization of shading and other processing procedures by application developers. Thus, in various embodiments, the example elements of FIG. 1A may be performed in various orders, performed in parallel, or omitted. Additional processing procedures may also be implemented.

Figure 1B:
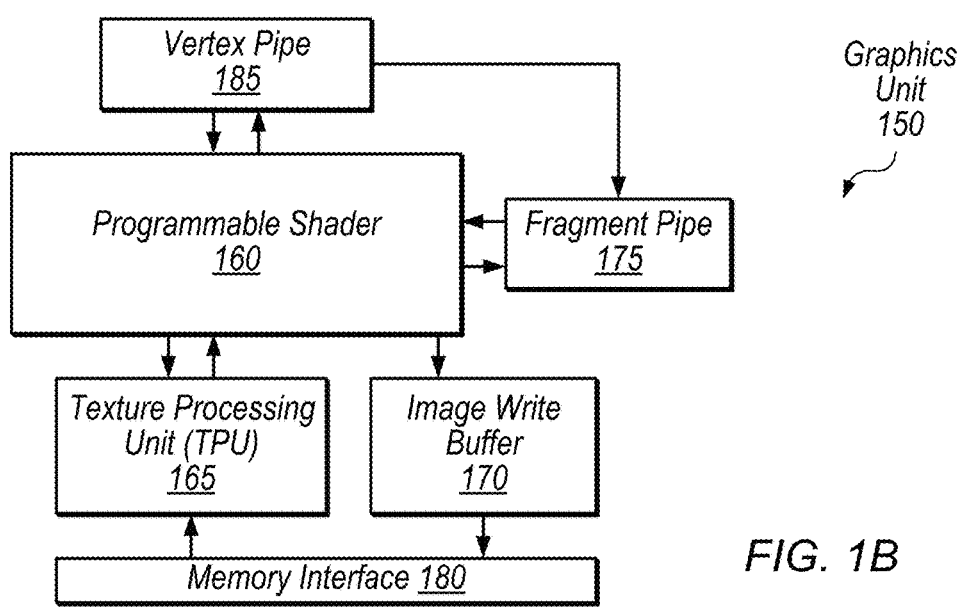
FIG. 1B is a block diagram illustrating an example graphics unit, according to some embodiments.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write buffer 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 or programmable shader 160 to generate fragment data. Vertex pipe 185 and fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and TPU 165. Programmable shader 160 may be configured to perform vertex processing tasks on vertex data which may include various transformations and adjustments of vertex data. Programmable shader 160, in the illustrated embodiment, is also configured to perform fragment processing tasks on pixel data such as texturing and shading, for example. Programmable shader 160 may include multiple sets of multiple execution pipelines for processing data in parallel.

In some embodiments, programmable shader includes pipelines configured to execute one or more different SIMD groups in parallel. Each pipeline may include various stages configured to perform operations in a given clock cycle, such as fetch, decode, issue, execute, etc. The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

The term "SIMD group" is intended to be interpreted according to its well-understood meaning, which includes a set of threads for which processing hardware processes the same instruction in parallel using different input data for the different threads. SIMD groups may also be referred to as SIMT groups (single-instruction, multiple-thread groups). Various types of computer processors may include sets of pipelines configured to execute SIMD instructions. For example, graphics processors often include programmable shader cores that are configured to execute instructions for a set of related threads in a SIMD fashion. Other examples of names that may be used for a SIMD group include: a wavefront, a clique, or a warp. A SIMD group may be a part of a larger thread group, which may be broken up into a number of SIMD groups based on the parallel processing capabilities of a computer. In some embodiments, each thread is assigned to a hardware pipeline that fetches operands for that thread and performs the specified operations in parallel with other pipelines for the set of threads. Note that processors may have a large number of pipelines such that multiple separate SIMD groups may also execute in parallel. In some embodiments, each thread has private operand storage, e.g., in a register file. Thus, a read of a particular register from the register file may provide the version of the register for each thread in a SIMD group.

In some embodiments, multiple programmable shader units 160 are included in a GPU. In these embodiments, global control circuitry may assign work to the different sub-portions of the GPU which may in turn assign work to shader cores to be processed by shader pipelines.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write buffer 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

As discussed above, graphics processors typically include specialized circuitry configured to perform certain graphics processing operations requested by a computing system. This may include fixed-function vertex processing circuitry, pixel processing circuitry, or texture sampling circuitry, for example. Graphics processors may also execute non-graphics compute tasks that may use GPU shader cores but may not use fixed-function graphics hardware. As one example, machine learning workloads (which may include inference, training, or both) are often assigned to GPUs because of their parallel processing capabilities. Thus, compute kernels executed by the GPU may include program instructions that specify machine learning tasks such as implementing neural network layers or other aspects of machine learning models to be executed by GPU shaders. In some scenarios, non-graphics workloads may also utilize specialized graphics circuitry, e.g., for a different purpose than originally intended.

Further, various circuitry and techniques discussed herein with reference to graphics processors may be implemented in other types of processors in other embodiments. Other types of processors may include general-purpose processors such as CPUs or machine learning or artificial intelligence accelerators with specialized parallel processing capabilities. These other types of processors may not be configured to execute graphics instructions or perform graphics operations. For example, other types of processors may not include fixed-function hardware that is included in typical GPUs. Machine learning accelerators may include specialized hardware for certain operations such as implementing neural network layers or other aspects of machine learning models. Speaking generally, there may be design tradeoffs between the memory requirements, computation capabilities, power consumption, and programmability of machine learning accelerators. Therefore, different implementations may focus on different performance goals. Developers may select from among multiple potential hardware targets for a given machine learning application, e.g., from among generic processors, GPUs, and different specialized machine learning accelerators.

Overview of Example Page Manager Circuitry

Figure 2:
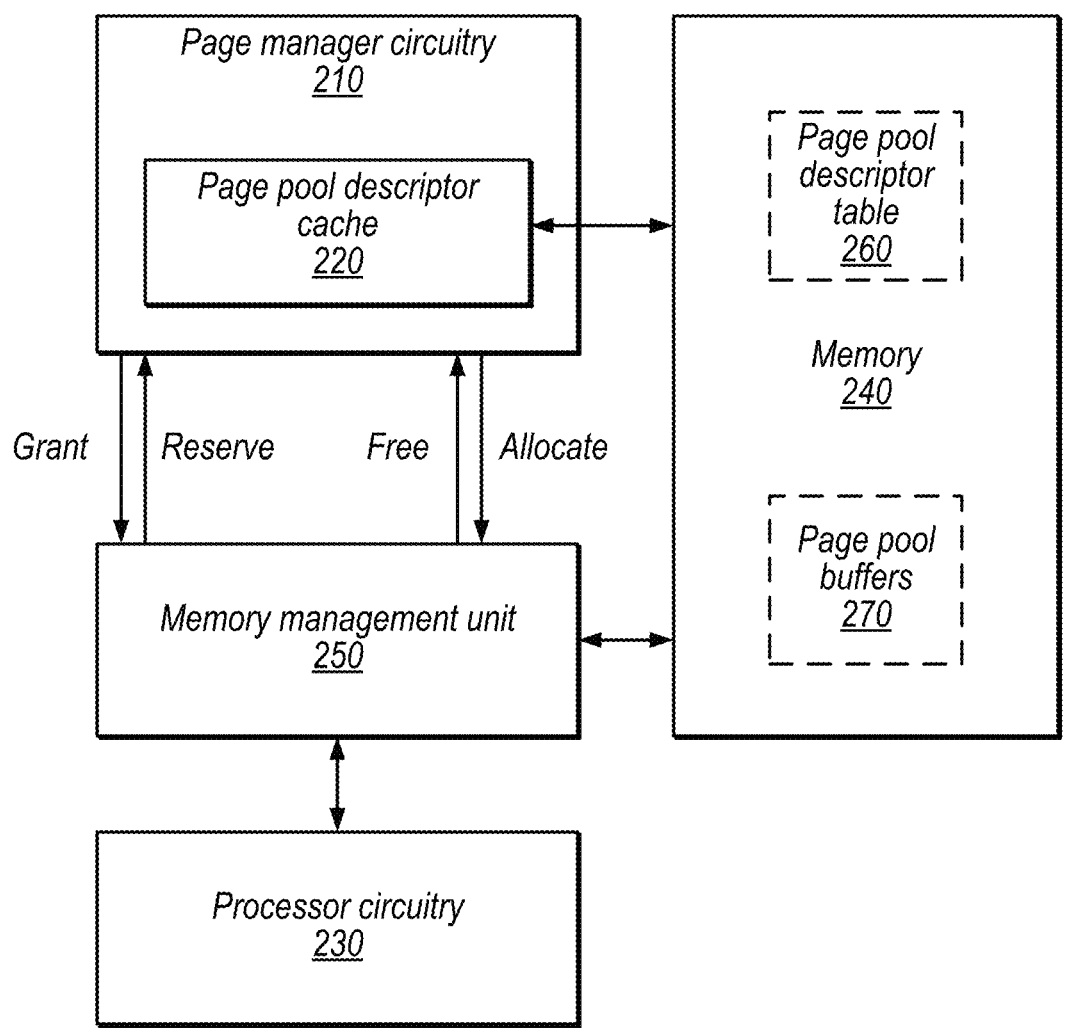
FIG. 2 is a block diagram illustrating example page manager circuitry with a page pool descriptor cache, according to some embodiments.

FIG. 2 is a block diagram illustrating example page manager circuitry, according to some embodiments. In the illustrated embodiment, a system includes page manager circuitry 210, processor circuitry 230, memory management unit (MMU) 250, and memory 240.

Processor circuitry 230 may be a graphics processor, for example. In some embodiments, processor circuitry 230 is a graphics processor sub-unit, which may also be referred to as an mGPU. In some embodiments each of multiple mGPUs may have a corresponding memory management unit 250.

Memory management unit 250, in some embodiments, is configured to translate private addresses to virtual addresses, e.g., as discussed in the '128 application. MMU 250 may be included in the memory allocator, in these embodiments. In some embodiments, a memory controller (not shown) is configured to translate virtual addresses to physical addresses in memory 240. MMU 250 may maintain a page table hierarchy for translating various processor addresses to GPU virtual addresses and page manager circuitry 210 may be configured to provide pages to store those page tables.

Note that memory paging in general is a well-understood memory management scheme in which an operating system retrieves data from secondary storage in pages (blocks of contiguous virtual memory addresses). Paging is commonly utilized in the context of virtual memory and uses page tables to translate a virtual address to a physical address. Paging in conjunction with virtual memory may allow programs to exceed the size of available physical memory.

In disclosed embodiments, paging may for multiple translation layers (e.g., both private to virtual address and virtual to physical addresses).

Page manager circuitry 210, in the illustrated embodiment, is configured to maintain page pool buffers 270 in memory 240 and a page pool descriptor table 260 that indicates which pages are included in which page pool. As shown, page manager circuitry 201 includes a page pool descriptor cache 220 configured to cache page pool descriptor entries. This may be particularly useful when multiple graphics kicks are sharing a page pool, e.g., when descriptor information can be updated at a single cache location in contrast to per-client updates in memory. Each descriptor table entry may indicate a base address of its page pool (e.g., virtual address), a size of its page pool, a read pointer for its page pool, a write pointer for its page pool, a count of available memory blocks, etc. In these embodiments, the page pools may behave as ring buffers. Each descriptor table entry may also indicate a set of clients that are connected to the cache entry, and multiple clients may share a page pool. In some embodiments, page manager circuitry 210 includes descriptor ring queue (DRQ) circuitry for each descriptor table cache entry that is configured to access a page pool's ring buffer in memory 240 to queue pages for distribution and return pages freed by clients. This DRQ circuitry may help hide latency in requesting virtual pages.

As shown, processor circuitry 230 and memory management unit 250 may communicate with page manager circuitry 210 to reserve pages in a page pool and page manager circuitry 210 may provide grant responses indicating when pages have been reserved. Pages may be reserved for a set of graphics work (e.g., a kick) or for the MMU page tables, for example. In some embodiments, the processor circuitry may wait to launch a set of work until all of the pages that it needs have been reserved.

Further, processor memory management unit 250 may communicate with page manager circuitry 210 for allocation of pages and to free pages that are not longer used (or were pre-fetched and not used). In some embodiments, both of these interfaces utilize a credit mechanism, e.g., in which allocated pages reduce MMU credits and freed pages return credits.

Figure 3:
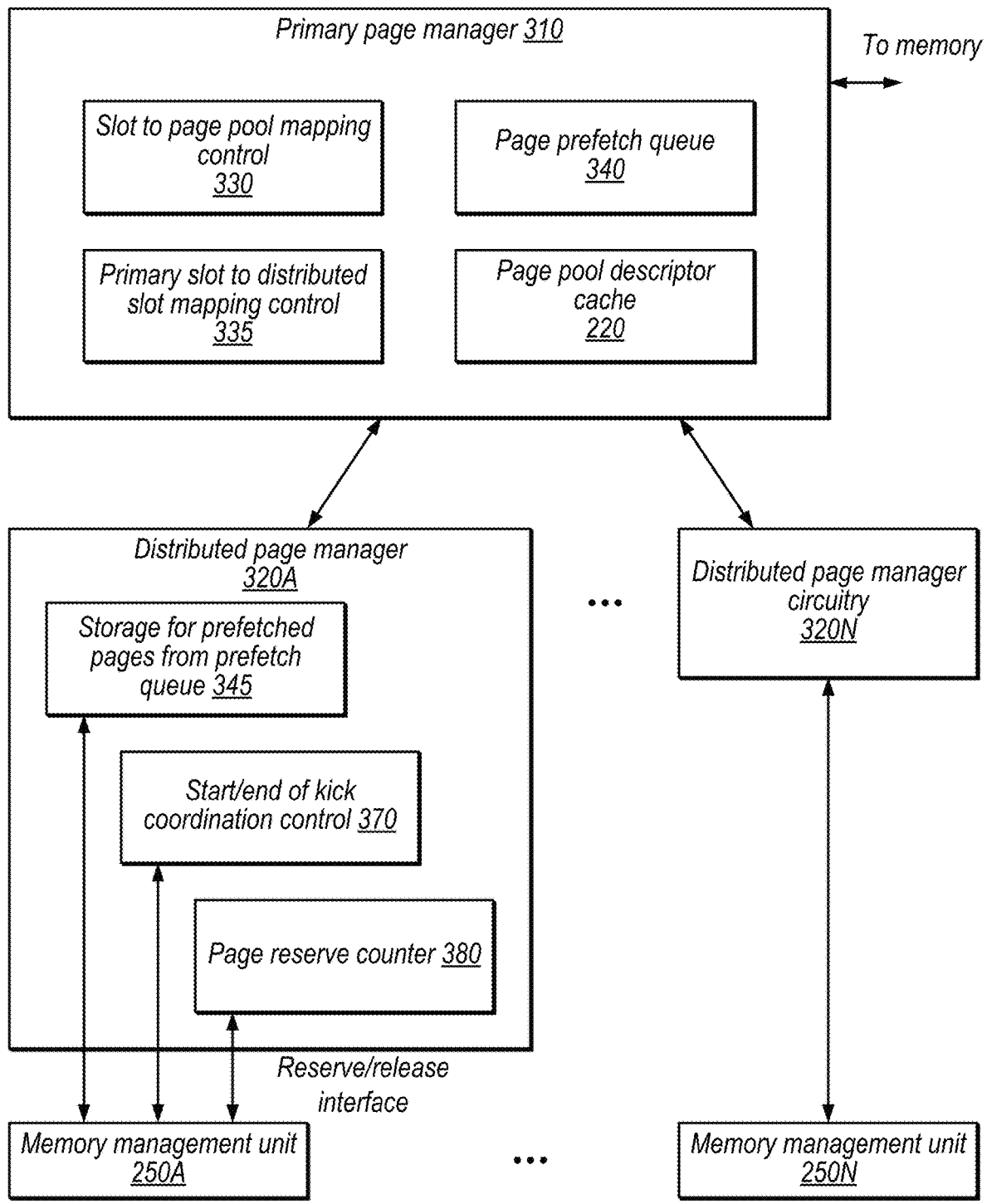
FIG. 3 is a block diagram illustrating example control blocks implemented by a primary page manager and multiple distributed page managers, according to some embodiments.

FIG. 3 is a block diagram illustrating a page manager embodiment with primary and distributed portions, according to some embodiments. In the illustrated embodiment, page manager circuitry includes a primary page manager 310 and multiple distributed page managers 320A-320N that communicate with multiple memory management units 250A-250N.

Primary page manager 310, in some embodiments, is configured to receive mappings (e.g., from graphics firmware) of primary slots to page pools, e.g., via configuration registers in slot to page pool mapping control 330. A new mapping may trigger primary page manager 310 to load a corresponding page pool descriptor table (PPDT) entry for the page pool into the page pool descriptor cache 220. Page manager 310 may also prefetch virtual pages indicated by the PPDT entry into page prefetch queue 340, which may allow them to be dispatched quickly when requested by an MMU.

Distributed page managers 320, in some embodiments, are configured to communicate with memory management units 250 to allow MMUs to reserve and release pages, e.g., via a dedicated reserve/release interface. The reserve/release interface may support requests for a count of virtual pages to be reserved or released and responses that indicate a grant or denial of a request. A distributed page manager 320 executing a particular kick may receive pages from the page prefetch queue 340, store them in storage 345, and distribute them to the MMU. For example, the distributed page manager 320 may implemented a credit-based allocation of the allocate/free interface for virtual pages in storage 345 to push pages to MMU hierarchies. Pages may be released back to the page pool when a shader program or a kick ends.

Note that the distributed page managers 320 and MMUs 250 may work at the granularity of distributed slots, which may be mapped to a primary slot. U.S. patent application Ser. No. 17/399,711 filed Aug. 11, 2021 is incorporated by reference herein in its entirety and discusses kickslot and logical kickslot techniques that may be used to track and distribute sets of processing work. Therefore, in the illustrated embodiment, primary page manager 310 includes primary slot to distributed slot mapping control 335 that is configured to map primary slots to distributed slots, e.g., per-mGPU, to allow routing pages from the page pool per primary slot to the correct distributed slot(s).

Start/end of kick coordination and control circuitry 370 may coordinate pre-allocation of virtual pages, e.g., at the start of a kick or shader program, so that they are available when needed and the mapping process does not add latency. In particular, a distributed page manager 320 may received a distributed-kick-slot-valid signal which may trigger it to send a kick-start command to the primary page manager 310, which acquires virtual pages from the page pool and begins satisfying page credits for the distributed page manager. As the distributed page manager 320 receives virtual pages from the page pool, it begins supplying pages to its MMU clients (e.g., a page catalog cache, page directory cache, page table cache, etc.). The distributed page manager 320 may use a credit-debit protocol to distributed virtual pages, and may pre-allocate different numbers of pages for different clients.

In these embodiments, a distributed page manager 320 may include credit tracking and virtual page distributer circuitry and queue virtual pages in storage 345. Primary page manager 310 may also include credit tracking for distributed page managers and a global prefetch queue 340.

At the end of a kick, the pre-allocated pages should be deallocated. Therefore, the system may not assert an end-kick-valid signal until all issued reserve-page and release-page requests have been acknowledged. Once the end-kick-valid signal is asserted, the MMU page table cache may free its pre-allocated pages back to a distributed page manager 320 which may also halt pre-allocation of pages. Given that different page table caches may receive kick-end-valid signals at different times, the distributed page manager 320 may track when it has received the halt request from every page table cache and may automatically stop sending virtual pages in response to available credits and initiate freeing of allocated pages. Start-end of kick coordinate control 370 may then coordinate with the primary page manager 210 to free its pages.

As one example, shader circuitry may communicate with page table caches by sending kick-end-valid signals and receiving kick-done-valid signals. A distributed page manager 320 may communicate with multiple page table caches via interfaces for pre-allocation halt/acknowledge, receiving free-page requests (for pages in storage 345), and end-of-kernel done/acknowledge. The distributed page manager 320 may send a halt-page-credits command to the primary page manager 310 and receive a page-credits-halted signal. The distributed page manager 320 may also send a free-page signal to free pages in the page prefetch queue 340.

Figure 4:
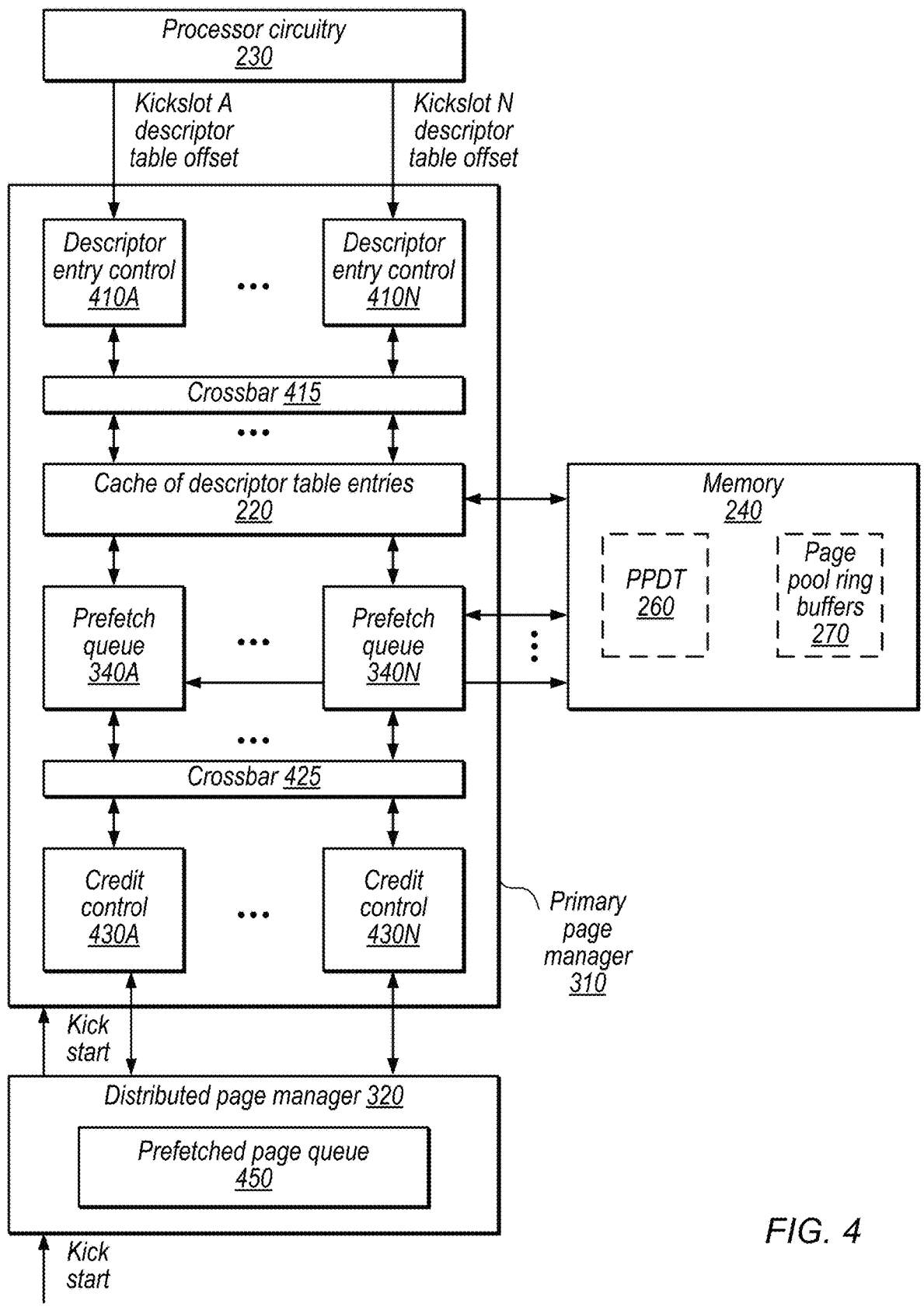
FIG. 4 is a block diagram illustrating a detailed example primary page manager implementation with prefetch queues, according to some embodiments.

FIG. 4 is a block diagram illustrating a more detailed example of primary page manager 310, according to some embodiments. In the illustrated example, primary page manager 310 includes descriptor entry control 410A-410N, crossbars 415 and 425, prefetch queues 340A-340N, and credit control circuitry 430A-430N.

Descriptor entry control (DEC) circuits 410, in some embodiments, are per-kickslot interfaces and are used to map slots to page pools, via descriptor table cache entries. In particular, each pool may be assigned a descriptor table entry, which may be reflected by the descriptor table offset from processor circuitry 230 shown in FIG. 4. When a primary slot starts, its DEC 410 may access the mapped entry of the cache 220. On a miss, primary page manager 310 fetches the entry from the PPDT 260 in memory. In the case of a hit or a miss, the DEC 410 may prevent eviction of the entry in cache 220 while the kick is active (generally, the least-recently-used non-active entry may be evicted to allocate an entry on a miss).

Prefetch queues 340, in the illustrated embodiment, store pre-fetched virtual pages for different page pools. Credit control circuits 430 may control distributing these pages to distributed page managers 320. Crossbars 415 and 425 may implement mappings of kickslots to page pools and primary slots to distributed slots.

Example Page Pool Descriptor Cache and Grow List

Figure 5:
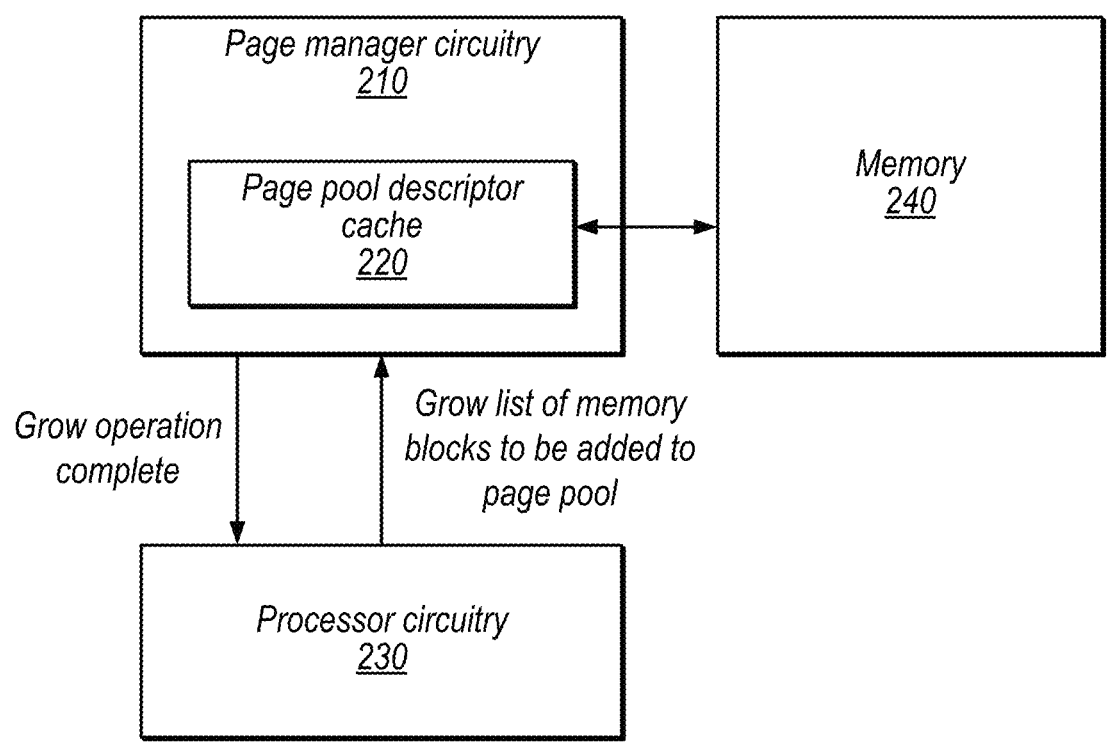
FIG. 5 is a block diagram illustrating example page manager circuitry configured to handle a page pool grow operation, according to some embodiments.

FIG. 5 is a block diagram illustrating an example computing system that includes page manager circuitry configured to facilitate a page pool grow operation, according to some embodiments. In the illustrated embodiment, the system includes page manager circuitry 210, page pool descriptor cache 220, processor circuitry 230, and memory 240.

Page manager circuitry 210, in the illustrated embodiment, includes page pool descriptor cache 220 which is configured to cache PPDT entries (which may also have space allocated in memory 240, e.g., when an entry is evicted from cache 220 to make room for another entry). Each valid cached entry may indicate a base address of its page pool (e.g., virtual address), a size of its page pool, a read pointer for its page pool, a write pointer for its page pool, a count of available memory blocks, etc. In these embodiments, the page pools may behave as ring buffers. Each descriptor table entry may also indicate a set of clients that are connected to the cache entry, and multiple clients may share a page pool. In some embodiments, page manager circuitry 210 includes descriptor ring queue (DRQ) circuitry for each descriptor table cache entry that is configured to access a page pool's ring buffer in memory 240 to queue pages for distribution and return pages freed by clients. This DRQ circuitry may help hide latency in requesting virtual pages.

As discussed above, the '128 application discusses memory allocator circuitry configured to dynamically map private memory addresses to virtual pages. Therefore, page manager circuitry 210 may be included in memory allocator circuitry, and the device may be configured to translate addresses from client circuits from private memory space addresses to virtual addresses. A memory controller (not shown) may translate the virtual addresses to physical addresses of memory 240 and may fetch pages into the memory when needed. Disclosed techniques may also be used in the context of logical kickslots, as discussed in the '711 application. Therefore, memory allocator circuitry may allocate memory for graphics kicks and may map one or more graphics kicks to one or more pages. In other embodiments, similar techniques may be utilized to manage sets of work in non-GPU processors.

In the illustrated embodiment, processor circuitry executes software (e.g., graphics firmware or an operating system) that provides a grow list of memory blocks to be added to a page pool. The processor circuitry may specify the page pool to be grown. In some embodiments, software running on processor circuitry 230 allocates memory for the grow list and populates it with pointers to memory to be added to the page pool.

Page manager circuitry 210, in some embodiments, checks that an entry for the page pool to be grown is cached in cache 220. If not, page manager circuitry 210 retrieves the PPDT entry from memory 240 and caches it in page pool descriptor cache 220. In either case, page manager circuitry 210 updates the cached PPDT entry to reflect the added memory blocks. Page manager circuitry 210 then sends a signal (e.g., an interrupt) to processor circuitry 230 indicating that the grow operation is complete. In embodiments with page pool threshold event (PPTE) functionality (discussed in detail below), the processor may enable PPTE for the page pool at this point.

In some embodiments, cache 220 includes one or more entries that are dedicated for grow operations such that they are not allocated for PPDT entries that are not being adjusted. This may avoid needing to evict an entry for a grow operation if all non-dedicated entries in the cache 220 are attached to active kickslots, for example, which may reduce or avoid stalling. Note that multiple sets of work (e.g., graphics kicks) may be assigned to the same page pool, multiple page pools may be assigned to a set of work, or both, in some implementations.

Multiple "kicks" may be executed to render a frame of graphics data. In some embodiments, a kick is a unit of work from a single context that may include multiple threads to be executed (and may potentially include other types of graphics work that is not performed by a shader). A kick may not provide any assurances regarding memory synchronization among threads (other than specified by the threads themselves), concurrency among threads, or launch order among threads. In some embodiments, a kick may be identified as dependent on the results of another kick, which may allow memory synchronization without requiring hardware memory coherency support. Typically, graphics firmware or hardware programs configuration registers for each kick before sending the work to the pipeline for processing. Often, once a kick has started, it does not access a memory hierarchy past a certain level until the kick is finished (at which point results may be written to another level in the hierarchy). Information for a given kick may include state information, location of shader program(s) to execute, buffer information, location of texture data, available address spaces, etc. that are needed to complete the corresponding graphics operations. Graphics firmware or hardware may schedule kicks and detect an interrupt when a kick is complete, for example. In some embodiments, portions of a graphics unit are configured to work on a single kick at a time. This set of resources may be referred to as a "kickslot." Thus, in some embodiments, any data that is needed for a given kick is read from memory that is shared among multiple processing elements at the beginning of the kick and results are written back to shared memory at the end of the kick. Therefore, other hardware may not see the results of the kick until completion of the kick, at which point the results are available in shared memory and can be accessed by other kicks (including kicks from other data masters). A kick may include a set of one or more rendering commands, which may include a command to draw procedural geometry, a command to set a shadow sampling method, a command to draw meshes, a command to retrieve a texture, a command to perform generation computation, etc. A kick may be executed at one of various stages during the rendering of a frame. Examples of rendering stages include, without limitation: camera rendering, light rendering, projection, texturing, fragment shading, etc. Kicks may be scheduled for compute work, vertex work, or pixel work, for example.

In some embodiments, a graphics driver maps a new kick to one of multiple kickslots. Each kickslot may include a set of configuration registers and may have a context ID that indicates a mapping between the kick's virtual addresses and physical addresses. In some embodiments, the graphics driver starts a persistent mapping thread for each kickslot via a configuration register, and starts the persistent mapping thread prior to starting the kick via a configuration register. In some embodiments, a mapping thread may persist across multiple kicks in a kickslot, e.g., if the kicks have the same context ID.

Note that an apparatus (e.g., a system-on-a-chip) may include page manager circuitry and processor circuitry 230, but memory 240 may be a separate chip. Although memory 240 is shown in FIG. 2, it is to be understood that an apparatus configured as disclosed herein may or may not include memory 240.

Figure 6:
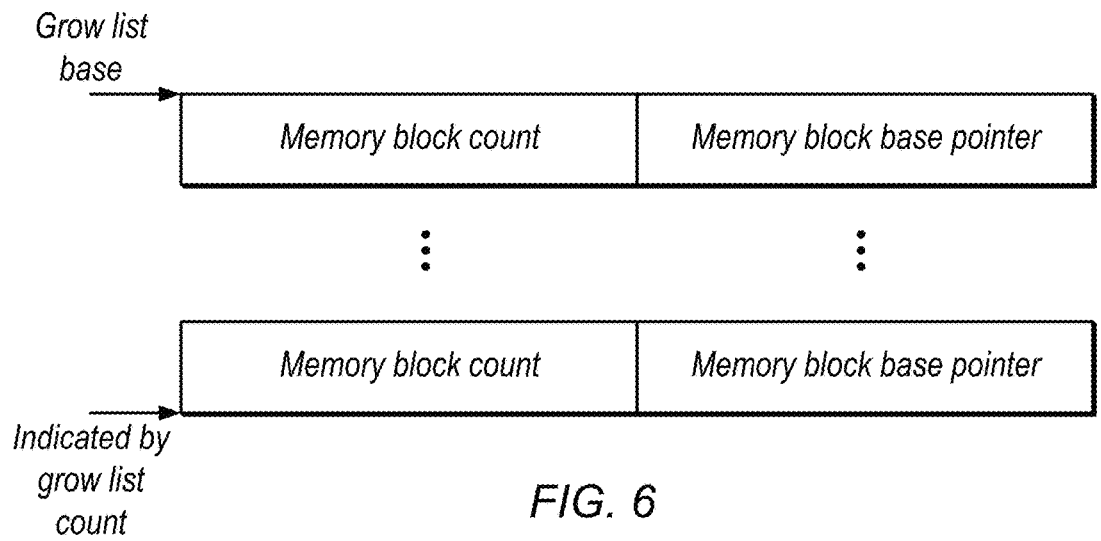
FIG. 6 is a diagram illustrating an example grow list data structure, according to some embodiments.

FIG. 6 is a diagram illustrating an example grow list data structure, according to some embodiments. In some embodiments, the grow list is allocated in the memory space associated with memory 240 (which may be a virtual space that is larger in size than the actual capacity of memory 240). In the illustrated embodiment, the grow list has a base address indicating the first entry and ends at a location indicated by a grow list count. In the illustrated embodiment, each entry includes a base address of a block of memory and a count of contiguous virtual pages to be allocated starting at that base address. This may allow variation in the sizes of the memory blocks that are added to the page pool from different locations.

In some embodiments, processor circuitry 230 may provide the grow list base address, grow list count, and a PPDT index corresponding to the page pool to the page manager circuitry 210. FIGS. 4 and 5 show example configuration registers that may be used to initiate a grow operation. In some embodiments, page manager circuitry 210 supports multiple types of grow operations, e.g., start-of-kick grow operations and asynchronous grow operations.

Figure 7:
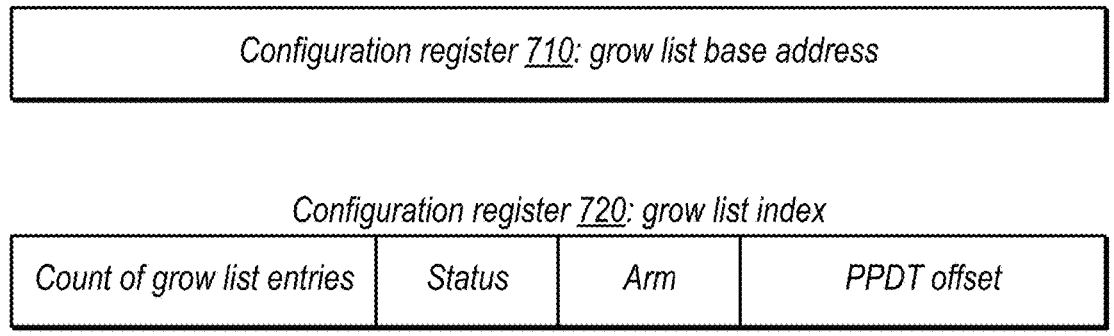
FIG. 7 is a block diagram illustrating example configuration registers for an asynchronous grow operation.

FIG. 7 shows example configuration registers for an asynchronous grow operation, according to some embodiments. In the illustrated example, configuration register 710 stores the base address of the grow list. Configuration register 720 includes fields to encode a count of the grow list entries, a status (e.g., which may indicate whether a grow operation is idle or active), an arm field (which may enable or disable PPTE, as discussed in further detail below), and a PPDT offset field that indicates the page pool being grown.

Figure 8:
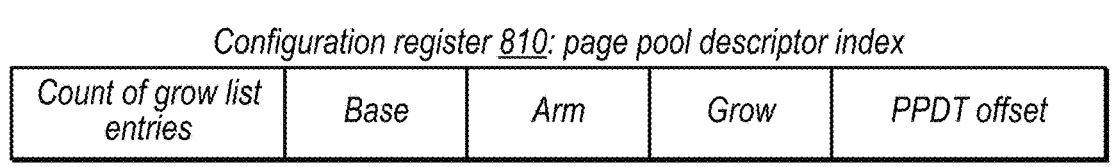
FIG. 8 is a block diagram illustrating an example configuration register for a start-of-kick grow operation.

FIG. 8 shows an example configuration register for a start-of-kick grow operation, according to some embodiments. Note that this type of grow operation may allow software to initialize a page pool with only a few pages (or none) and then trigger the page manager circuitry 210 to grow the page pool at the start of a kick.

In the illustrated example, configuration register 810 includes fields such as a count of grow list entries, a base address of the grow list, am arm field (e.g., to enable or disable PPTE), a grow field that indicates whether to initiate a grow operation at start-of-kick, and a PPDT offset. If the grow field is not set, a kick may begin operation using the initial page pool without a grow operation. The processor may not perform a grow operation if a kick is dequeued, for example, even if the grow field was set. If both the grow and arm fields are set, control circuitry may not actually enable PPTE until the start-of-kick grow operation is complete.

In some embodiments, control circuitry may ensure that a kick does not end while a grow operation is still in progress. For example, the control circuitry may delay an end-of-kick memory fence operation until all writes for the grow operations have been flushed to memory and fenced.

In various embodiments, other appropriate signals, encodings, registers, etc. may be used to communicate the grow list from a processor to page manager circuitry that facilitates the grow operation for a page pool. The disclosed configuration registers are included for purposes of explanation but are not intended to limit the scope of the present disclosure.

Example Threshold Event when Page Pool is Low

Figure 9:
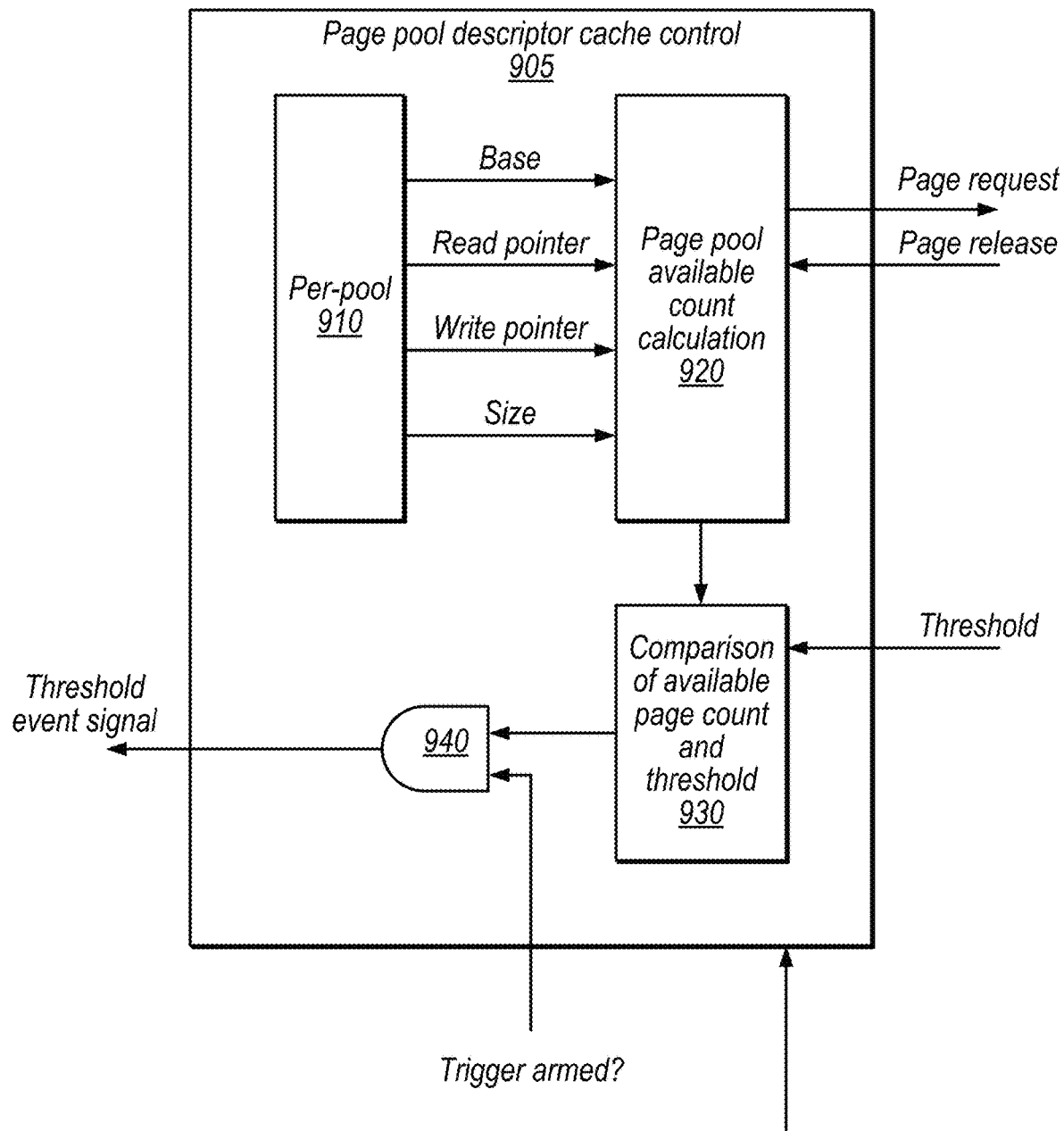
FIG. 9 is a block diagram illustrating example page pool descriptor cache circuitry configured to generate a signal when an available page count for a pool drops below a threshold, according to some embodiments.

FIG. 9 is a block diagram illustrating page pool descriptor cache circuitry configured to determine available pages in a page pool and trigger a threshold event signal under certain conditions, according to some embodiments.

Page pool descriptor cache 220, in the illustrated embodiment, includes per-pool ring buffer state information 910 (which may be stored in a PPDT cache entry for a given page pool), page pool available count calculation 920, comparison circuitry 930, and AND gate 940. As shown, each page pool may provide ring buffer state to calculation circuitry 920, which may determine the available pages in a page pool based on requests, releases, a base address of the ring buffer, read/write pointers of the ring buffer, and the size of the ring buffer. Note that the ring buffers and PPDT entries may be stored in the same memory space. In other embodiments, page pools may be tracked using other data structures and a PPDT cache entry may provide various appropriate information to calculation circuitry 920.

Page pool available count calculation 920 receives page request and release commands, in the illustrated embodiment, which may be used to update read and write pointers. Calculation circuitry 920 provides the current count of available pages to comparison circuitry 930, which compares the count with a threshold (which may be programmable). If the count value meets the threshold (e.g., matches the threshold or is below the threshold, depending on the implementation), the output of comparison circuitry 930 is set. If the PPTE trigger is also armed, AND gate 940 causes a threshold event signal (e.g., an interrupt). This signal may be an early warning that the page pool may become empty soon. In some embodiments, the interrupt is handled by an interrupt controller and cache 220 may route the interrupt to the interrupt controller via a communications fabric.

Software (e.g., firmware or an operating system) may act based on the signal to begin adding virtual pages to the pool early, e.g., by initiating a page pool grow operation as discussed above. In some embodiments, software configures the threshold and arms PPTE interrupts using a configuration register for a given page pool. In some embodiments, the control circuitry auto-clears the arm field when a PPTE occurs and the software may subsequently re-arm PPTE (e.g., as part of the grow operation). This may prevent software from receiving multiple interrupts when the threshold is crossed multiple times in quick succession, which may occur when pages are being requested and released. In some embodiments, software may decide not to re-arm PPTE interrupts, e.g., when the page pool is already at its maximum size.

Disclosed techniques may advantageously provide various performance and power improvements relative to traditional implementations. For example, using a PPTE threshold instead of waiting until a page pool is empty may hide the latency of requesting pages from the operating system, waiting for the request to be granted, and copying into the ring buffer. This may be particularly useful in scenarios where a GPU powers up briefly to complete some work and then powers down to save power. For example, disclosed techniques may avoid the GPU needing to wait for a page to be available when it wakes to do the work. Therefore, disclosed PPTE techniques may reduce latency and stall power for acquiring pages.

Similarly disclosed techniques may reduce latency and power associated with adjusting a page pool. For example, relative to halting a PPDT entry (and any work mapped to the entry), saving cached PPDT information, loading new PPDT information from memory, and un-halting disclosed techniques reduce stall latency, disclosed techniques may substantially reduce handshake communications between hardware and software and the latency needed to grow the page pool.

Example Methods

Figure 10:
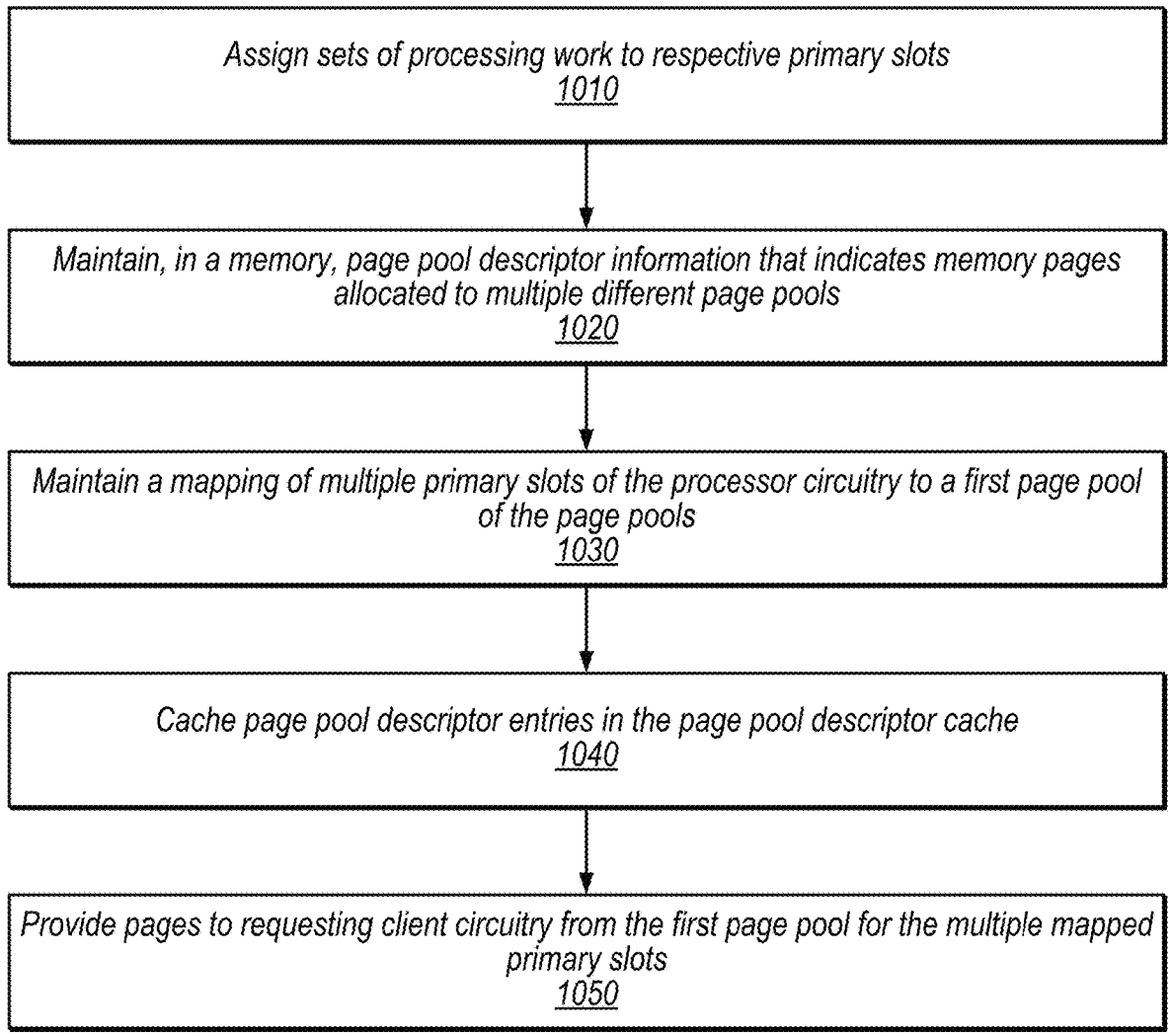
FIGS. 10 and 11 are flow diagrams illustrating example methods, according to some embodiments.

FIG. 10 is a flow diagram illustrating an example method for managing a page pool, according to some embodiments. The method shown in FIG. 10 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1010, in the illustrated embodiment, processor circuitry assigns sets of processing work to respective primary slots.

At 1020, in the illustrated embodiment, page manager circuitry maintains, in a memory, page pool descriptor information that indicates memory pages allocated to multiple different page pools.

At 1030, in the illustrated embodiment, page manager circuitry maintains a mapping of multiple primary slots of the processor circuitry to a first page pool of the page pools.

At 1040, in the illustrated embodiment, page manager circuitry caches page pool descriptor entries in the page pool descriptor cache.

At 1050, in the illustrated embodiment, page manager circuitry provides pages to requesting client circuitry from the first page pool for the multiple mapped primary slots. the page manager circuitry includes a prefetch queue configured to store prefetched pages for one or more primary slots from one or more corresponding page pools.

In some embodiments, the page pools provide pages for a page table hierarchy controlled by a MMU of the processor, where the MMU uses the page table hierarchy to translate graphics space addresses to virtual addresses.

In some embodiments, the page manager circuitry is configured to receive a page reservation request for a set of processing work and reserve a requested number of pages in response to determining that a corresponding page pool includes a sufficient number of pages for the request. In some embodiments, the apparatus is configured to launch the set of processing work only after reservation of the requested number of pages by the page manager circuitry.

In some embodiments, the page manager circuitry includes primary page manager circuitry and multiple distributed page manager circuits configured to interface with memory management units for different processor sub-units.

In some embodiments, the primary page manager circuitry is configured to maintain a mapping of a given primary slot to a set of one or more distributed slots. In some embodiments, the primary page manager circuit includes storage for prefetched pages from respective page pools and the distributed page manager circuits include storage for prefetched pages from respective page pools. In these embodiments, the primary page manager circuitry may be configured to begin distributing prefetched pages to the distribute page manager circuits in response to the given primary slot starting execution and completion of the mapping of the given primary slot to the set of one or more distributed slots.

In some embodiments, the primary page manager circuitry is configured to distribute prefetched pages to distributed page manager circuits according to a credit mechanism and the distributed page manager circuits are configured to distribute pages to memory management units according to a credit mechanism.

Figure 11:
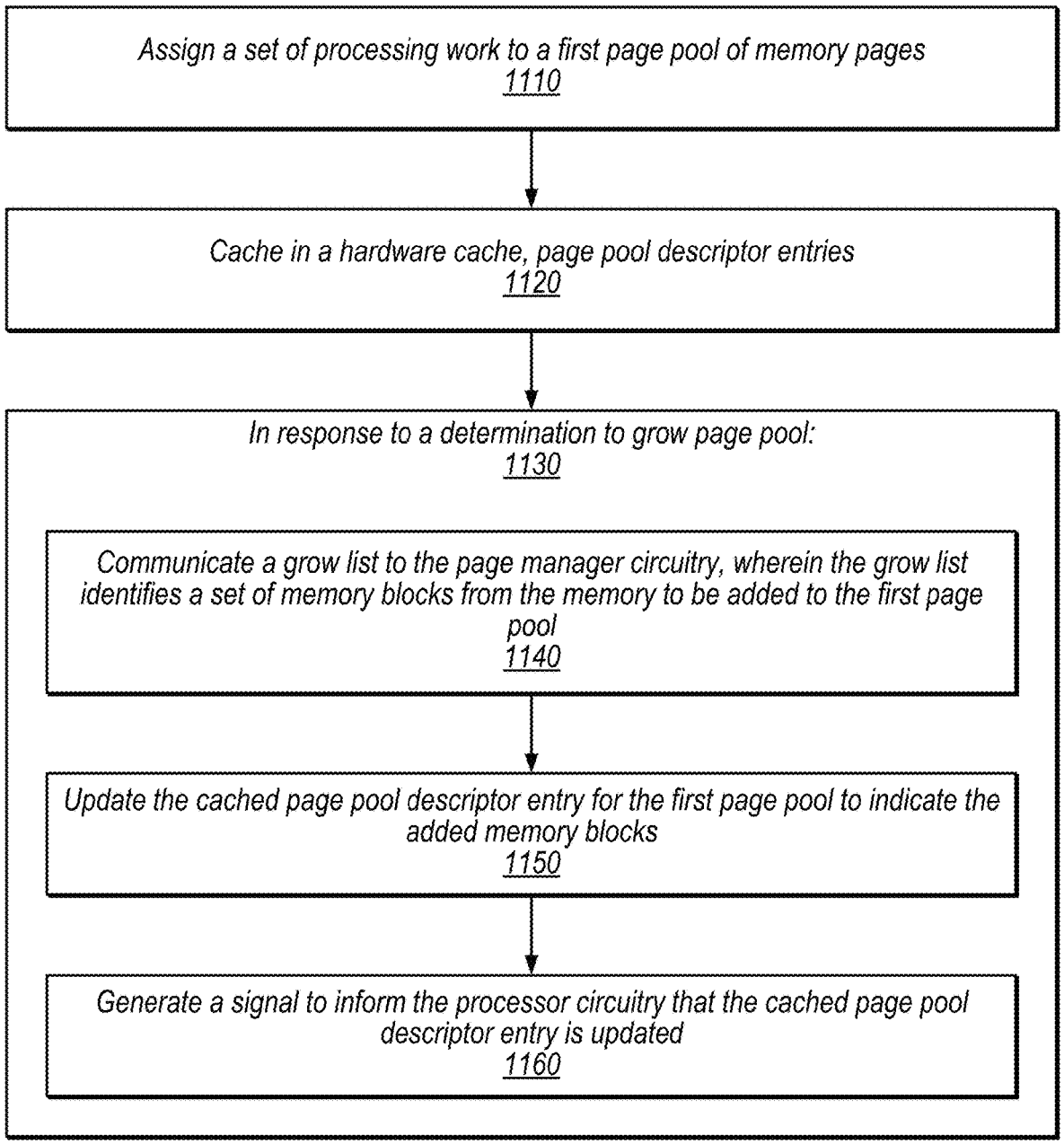

FIG. 11 is a flow diagram illustrating an example method for modifying a page pool, according to some embodiments. The method shown in FIG. 11 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1110, in the illustrated embodiment, a processor assigns a set of processing work to a first page pool of memory pages.

At 1120, in the illustrated embodiment, page manager circuitry caches, in a hardware cache, page pool descriptor entries, where a given page pool descriptor entry indicates a set of pages assigned to a page pool.

At 1130, in the illustrated embodiment, a computing device performs multiple elements in response to a determination to grow the page pool.

At 1140, in the illustrated embodiment, the processor communicates a grow list to the page manager circuitry, where the grow list identifies a set of memory blocks from the memory to be added to the first page pool. In some embodiments, the grow list includes multiple entries that each include a pointer and a count of memory blocks to be added to the page pool starting from a location corresponding to the pointer.

The processor may communicate the grow list using various techniques. As one example, the device may include one or more programmable registers configured to specify: a base address of a given grow list, a count of grow list entries, and an offset in the page pool descriptor table corresponding to a given page pool.

At 1150, in the illustrated embodiment, the page manager circuitry updates the cached page pool descriptor entry for the first page pool to indicate the added memory blocks.

At 1160, in the illustrated embodiment, the page manager circuitry generates a signal to inform the processor circuitry that the cached page pool descriptor entry is updated.

In some embodiments, the page manager circuitry generates a signal in response to a determination that a number of available pages in the first page pool meets a threshold (e.g., matches or is below the PPTE threshold). In some embodiments, arming and disabling the signal is software-configurable. For example, when the signal is disabled the page manager circuitry may not generate an interrupt until a page pool does not have any available pages left. In some embodiments, the signal is an interrupt and the threshold is programmable. This may allow software to specify a threshold number of remaining available pages in a pool that will trigger an interrupt. In some embodiments, the processor initiates a grow operation for the page pool in response to the interrupt and allocates memory for the grow list.

In some embodiments, the device includes separate configuration registers configured to indicate grow lists for start-of-work grow operations and asynchronous grow operations. In some embodiments, a given page pool descriptor entry indicates a base address of its page pool, a size of its page pool, a read pointer for its page pool, and a write pointer for its page pool. In some embodiments, the memory in which the page pool descriptor information is stored is also the memory in which the memory pages are allocated.

In some embodiments, the processor circuitry is included in a graphics processor and the page manager circuitry is configured to allocate memory for one or more private graphics address spaces. In other embodiments, the processor circuitry may be included in a central processing unit (CPU) or a microcontroller.

Example Device

Figure 12:
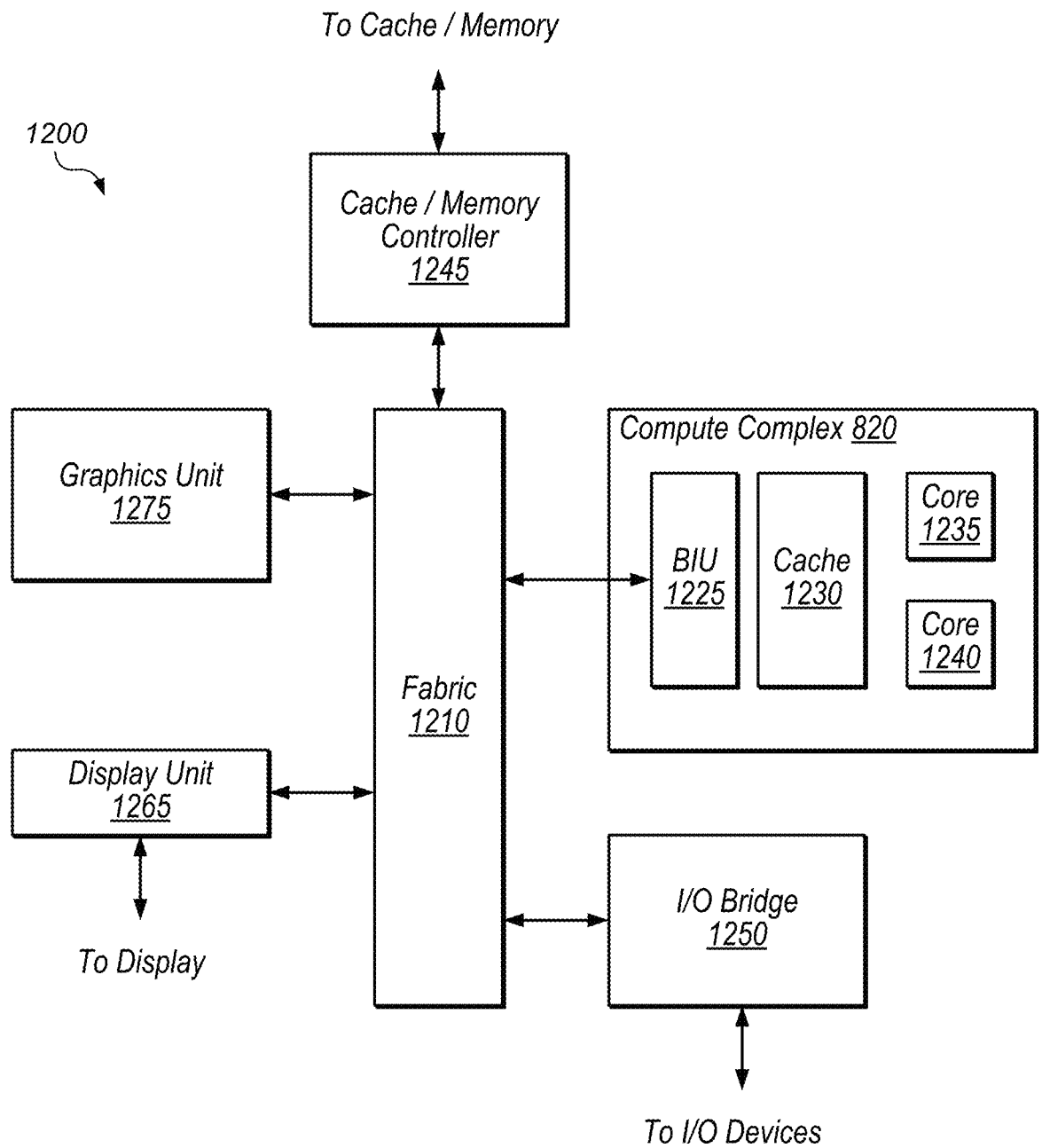
FIG. 12 is a block diagram illustrating an example computing device, according to some embodiments.

Referring now to FIG. 12, a block diagram illustrating an example embodiment of a device 1200 is shown. In some embodiments, elements of device 1200 may be included within a system on a chip. In some embodiments, device 1200 may be included in a mobile device, which may be battery-powered. Therefore, power consumption by device 1200 may be an important design consideration. In the illustrated embodiment, device 1200 includes fabric 1210, compute complex 1220 input/output (I/O) bridge 1250, cache/memory controller 1245, graphics unit 1275, and display unit 1265. In some embodiments, device 1200 may include other components (not shown) in addition to or in place of the illustrated components, such as video processor encoders and decoders, image processing or recognition elements, computer vision elements, etc.

Fabric 1210 may include various interconnects, buses, MUX's, controllers, etc., and may be configured to facilitate communication between various elements of device 1200. In some embodiments, portions of fabric 1210 may be configured to implement various different communication protocols. In other embodiments, fabric 1210 may implement a single communication protocol and elements coupled to fabric 1210 may convert from the single communication protocol to other communication protocols internally.

In the illustrated embodiment, compute complex 1220 includes bus interface unit (BIU) 1225, cache 1230, and cores 1235 and 1240. In various embodiments, compute complex 1220 may include various numbers of processors, processor cores and caches. For example, compute complex 1220 may include 1, 2, or 4 processor cores, or any other suitable number. In one embodiment, cache 1230 is a set associative L2 cache. In some embodiments, cores 1235 and 1240 may include internal instruction and data caches. In some embodiments, a coherency unit (not shown) in fabric 1210, cache 1230, or elsewhere in device 1200 may be configured to maintain coherency between various caches of device 1200. BIU 1225 may be configured to manage communication between compute complex 1220 and other elements of device 1200. Processor cores such as cores 1235 and 1240 may be configured to execute instructions of a particular instruction set architecture (ISA) which may include operating system instructions and user application instructions.

In some embodiments, disclosed techniques may advantageously improve performance by providing pages to memory allocator circuitry quickly (e.g., using prefetching, caching PPDT entries, etc.). Disclosed techniques may also reduce or avoid halting a set of work processed by compute complex 1220 when its page pool needs to grow.

Cache/memory controller 1245 may be configured to manage transfer of data between fabric 1210 and one or more caches and memories. For example, cache/memory controller 1245 may be coupled to an L3 cache, which may in turn be coupled to a system memory. In other embodiments, cache/memory controller 1245 may be directly coupled to a memory. In some embodiments, cache/memory controller 1245 may include one or more internal caches.

As used herein, the term "coupled to" may indicate one or more connections between elements, and a coupling may include intervening elements. For example, in FIG. 12, graphics unit 1275 may be described as "coupled to" a memory through fabric 1210 and cache/memory controller 1245. In contrast, in the illustrated embodiment of FIG. 12, graphics unit 1275 is "directly coupled" to fabric 1210 because there are no intervening elements.

Graphics unit 1275 may include one or more processors, e.g., one or more graphics processing units (GPU's). Graphics unit 1275 may receive graphics-oriented instructions, such as OPENGL®, Metal, or DIRECT3D® instructions, for example. Graphics unit 1275 may execute specialized GPU instructions or perform other operations based on the received graphics-oriented instructions. Graphics unit 1275 may generally be configured to process large blocks of data in parallel and may build images in a frame buffer for output to a display, which may be included in the device or may be a separate device. Graphics unit 1275 may include transform, lighting, triangle, and rendering engines in one or more graphics processing pipelines. Graphics unit 1275 may output pixel information for display images. Graphics unit 1275, in various embodiments, may include programmable shader circuitry which may include highly parallel execution cores configured to execute graphics programs, which may include pixel tasks, vertex tasks, and compute tasks (which may or may not be graphics-related).

In some embodiments, disclosed techniques may advantageously improve performance of graphics unit 1275.

Display unit 1265 may be configured to read data from a frame buffer and provide a stream of pixel values for display. Display unit 1265 may be configured as a display pipeline in some embodiments. Additionally, display unit 1265 may be configured to blend multiple frames to produce an output frame. Further, display unit 1265 may include one or more interfaces (e.g., MIPI® or embedded display port (eDP)) for coupling to a user display (e.g., a touchscreen or an external display).

I/O bridge 1250 may include various elements configured to implement: universal serial bus (USB) communications, security, audio, and low-power always-on functionality, for example. I/O bridge 1250 may also include interfaces such as pulse-width modulation (PWM), general-purpose input/output (GPIO), serial peripheral interface (SPI), and inter-integrated circuit (I2C), for example. Various types of peripherals and devices may be coupled to device 1200 via I/O bridge 1250.

In some embodiments, device 1200 includes network interface circuitry (not explicitly shown), which may be connected to fabric 1210 or I/O bridge 1250. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 1200 with connectivity to various types of other devices and networks.

Example Applications

Figure 13:
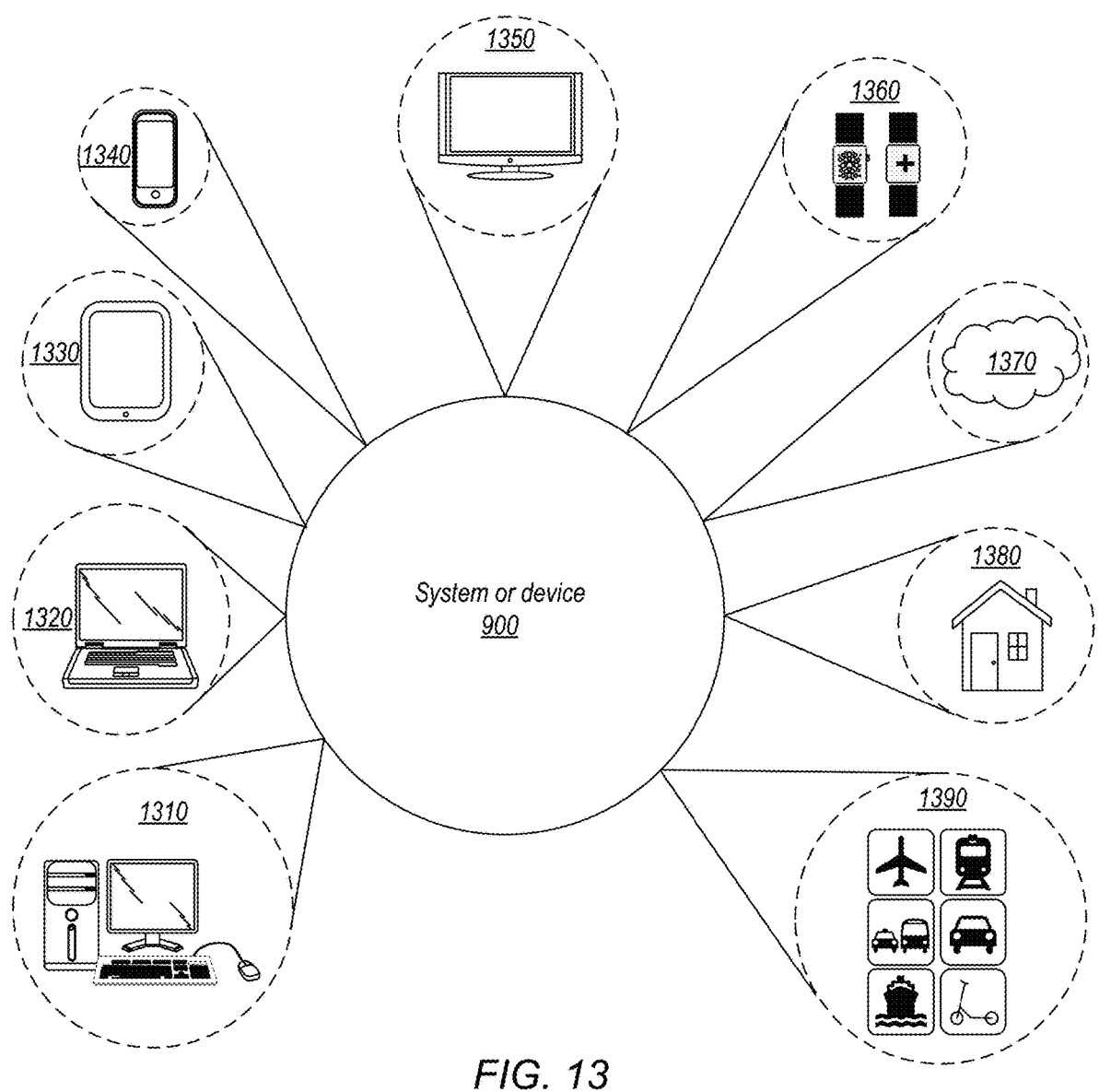
FIG. 13 is a diagram illustrating example applications of disclosed systems and devices, according to some embodiments.

Turning now to FIG. 13, various types of systems that may include any of the circuits, devices, or system discussed above. System or device 1300, which may incorporate or otherwise utilize one or more of the techniques described herein, may be utilized in a wide range of areas. For example, system or device 1300 may be utilized as part of the hardware of systems such as a desktop computer 1310, laptop computer 1320, tablet computer 1330, cellular or mobile phone 1340, or television 1350 (or set-top box coupled to a television).

Similarly, disclosed elements may be utilized in a wearable device 1360, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1300 may also be used in various other contexts. For example, system or device 1300 may be utilized in the context of a server computer system, such as a dedicated server or on shared hardware that implements a cloud-based service 1370. Still further, system or device 1300 may be implemented in a wide range of specialized everyday devices, including devices 1380 commonly found in the home such as refrigerators, thermostats, security cameras, etc. The interconnection of such devices is often referred to as the "Internet of Things" (IoT). Elements may also be implemented in various modes of transportation. For example, system or device 1300 could be employed in the control systems, guidance systems, entertainment systems, etc. of various types of vehicles 1390.

The applications illustrated in FIG. 13 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 14:
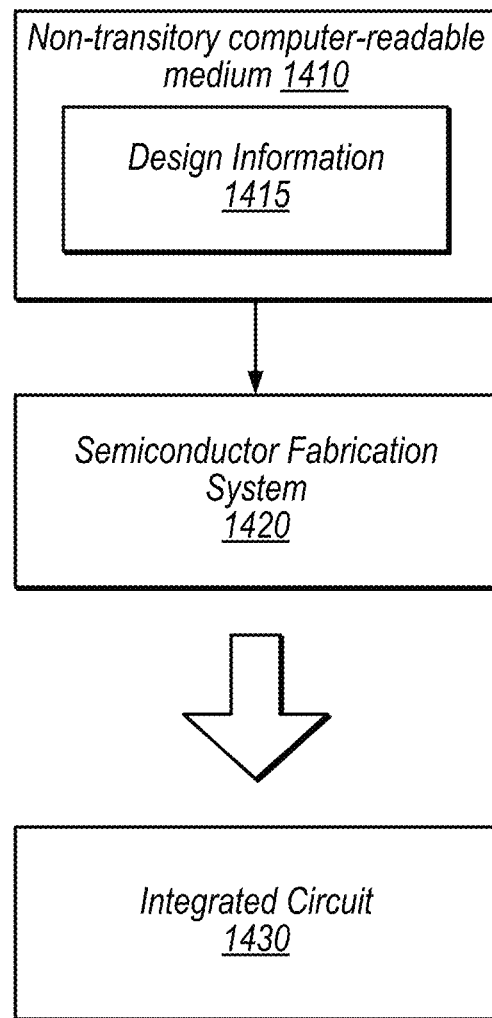
FIG. 14 is a block diagram illustrating an example computer-readable medium that stores circuit design information, according to some embodiments.

FIG. 14 is a block diagram illustrating an example non-transitory computer-readable storage medium that stores circuit design information, according to some embodiments. In the illustrated embodiment semiconductor fabrication system 1420 is configured to process the design information 1415 stored on non-transitory computer-readable medium 1410 and fabricate integrated circuit 1430 based on the design information 1415.

Non-transitory computer-readable storage medium 1410, may comprise any of various appropriate types of memory devices or storage devices. Non-transitory computer-readable storage medium 1410 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1410 may include other types of non-transitory memory as well or combinations thereof. Non-transitory computer-readable storage medium 1410 may include two or more memory mediums which may reside in different locations, e.g., in different computer systems that are connected over a network.

Design information 1415 may be specified using any of various appropriate computer languages, including hardware description languages such as, without limitation: VHDL, Verilog, SystemC, SystemVerilog, RHDL, M, MyHDL, etc. Design information 1415 may be usable by semiconductor fabrication system 1420 to fabricate at least a portion of integrated circuit 1430. The format of design information 1415 may be recognized by at least one semiconductor fabrication system 1420. In some embodiments, design information 1415 may also include one or more cell libraries which specify the synthesis, layout, or both of integrated circuit 1430. In some embodiments, the design information is specified in whole or in part in the form of a netlist that specifies cell library elements and their connectivity. Design information 1415, taken alone, may or may not include sufficient information for fabrication of a corresponding integrated circuit. For example, design information 1415 may specify the circuit elements to be fabricated but not their physical layout. In this case, design information 1415 may need to be combined with layout information to actually fabricate the specified circuitry.

Integrated circuit 1430 may, in various embodiments, include one or more custom macrocells, such as memories, analog or mixed-signal circuits, and the like. In such cases, design information 1415 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1420 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1420 may also be configured to perform various testing of fabricated circuits for correct operation.

In various embodiments, integrated circuit 1430 is configured to operate according to a circuit design specified by design information 1415, which may include performing any of the functionality described herein. For example, integrated circuit 1430 may include any of various elements shown in FIGS. 1B, 2-5, 9, and 12. Further, integrated circuit 1430 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112 (f) for that claim element. Should Applicant wish to invoke Section 112 (f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A method, comprising:
maintaining, in memory of a computing system, first and second page pool descriptors that indicate, respectively, a first set of one or more memory pages allocated to a first page pool and a second set of one or more memory pages allocated to a second page pool, wherein a given page pool descriptor specifies:
a location of the corresponding page pool; and
page pool size information;
storing, by the computing system in first and second entries of a page pool descriptor cache, the first and second page pool descriptors from the memory; and
providing, by the computing system, a page to requesting client circuitry from the corresponding page pool based on the first stored page pool descriptor.

2. The method of claim 1, further comprising:
mapping a set of processing work to a first page in the page pool.

3. The method of claim 2, wherein the mapping includes assigning the set of processing work to a logical slot of a distributed graphics processor and mapping the logical slot to the first page.

4. The method of claim 1, further comprising:
prefetching, by the computing system, a page from a page pool and storing the prefetched page in a prefetch queue; and
storing, by the computing system, a page pool descriptor for the prefetched page in the page pool descriptor cache.

5. The method of claim 1, wherein the page pools provide pages for a page table hierarchy controlled by a memory management unit (MMU), wherein the MMU uses the page table hierarchy to translate graphics space addresses to virtual addresses.

6. The method of claim 1, further comprising:
receiving, by the computing system, a page reservation request for a set of processing work; and
reserving, by the computing system, a requested number of pages in response to determining that a corresponding page pool includes a sufficient number of pages for the request;
wherein the computing system launches the set of processing work only after reservation of the requested number of pages.

7. The method of claim 1, further comprising:
prefetching, by the computing system, a page from a page pool and storing the prefetched page in a prefetch queue; and
distributing, by the computing system in response to given set of processing work starting execution, prefetched pages for the given set of processing work to one or more distributed prefetch queues.

8. The method of claim 7, further comprising:
distributing, by the computing system, prefetched pages to distributed prefetch queues according to a credit mechanism and distributing pages from the distributed prefetch queues to memory management units according to a credit mechanism.

9. An apparatus, comprising:
a page pool descriptor cache; and
page manager circuitry configured to:
maintain, in memory circuitry, first and second page pool descriptors to indicate, respectively, a first set of one or more memory pages allocated to a first page pool and a second set of one or more memory pages allocated to a second page pool, wherein a given page pool descriptor specifies:
a location of the corresponding page pool; and
page pool size information;
store the first and second page pool descriptors from the memory circuitry in first and second entries of the page pool descriptor cache; and
provide a page to requesting client circuitry from the corresponding page pool based on the first stored page pool descriptor.

10. The apparatus of claim 9, further comprising:
control circuitry configured to map a set of processing work to a first page in the page pool.

11. The apparatus of claim 10, wherein:
the apparatus includes a graphics processor that includes the page pool descriptor cache and the page manager circuitry; and to map the set of processing work to the first page, the page manager circuitry is configured to assign the set of processing work to a slot of the graphics processor and map the slot to the first page.

12. The apparatus of claim 9, wherein the page manager circuitry is further configured to:
prefetch a page from a page pool and store the prefetched page in a prefetch queue; and
cache a page pool descriptor for the prefetched page in the page pool descriptor cache.

13. The apparatus of claim 9, wherein the page pools provide pages for a page table hierarchy controlled by a memory management unit (MMU), wherein the MMU uses the page table hierarchy to translate graphics space addresses to virtual addresses.

14. The apparatus of claim 9, wherein the page manager circuitry is further configured to:
receive a page reservation request for a set of processing work; and
reserve a requested number of pages in response to determining that a corresponding page pool includes a sufficient number of pages for the request;
wherein the apparatus is configured to launch the set of processing work only after reservation of the requested number of pages by the page manager circuitry.

15. The apparatus of claim 9, wherein the page manager circuitry includes:
primary page manager circuitry; and
multiple distributed page manager circuits configured to interface with memory management units for different processor sub-units;
wherein:
the primary page manager circuitry includes storage for prefetched pages from respective page pools;
the distributed page manager circuits include storage for prefetched pages from respective page pools; and
the primary page manager circuitry is configured to begin distributing prefetched pages to the distributed page manager circuits in response to a given set of processing work starting execution.

16. The apparatus of claim 15, wherein the primary page manager circuitry is configured to distribute prefetched pages to distributed page manager circuits according to a credit mechanism and the distributed page manager circuits are configured to distribute pages to memory management units according to a credit mechanism.

17. The apparatus of claim 9, wherein the apparatus is a computing device that includes:
a central processing unit;
a graphic processing unit;
a display; and
network interface circuitry.

18. A non-transitory computer readable storage medium having stored thereon design information that specifies a design of at least a portion of a hardware integrated circuit in a format recognized by a semiconductor fabrication system that is configured to use the design information to produce the circuit according to the design, wherein the design information specifies that the circuit includes:
a page pool descriptor cache; and
page manager circuitry configured to:
maintain, in memory circuitry, first and second page pool descriptors to indicate, respectively, a first set of one or more memory pages allocated to a first page pool and a second set of one or more memory pages allocated to a second page pool, wherein a given page pool descriptor specifies:
a location of the corresponding page pool; and
page pool size information;
store the first and second page pool descriptors from the memory circuitry in first and second entries of the page pool descriptor cache; and
provide a page to requesting client circuitry from the corresponding page pool based on the first stored page pool descriptor.

19. The non-transitory computer readable storage medium of claim 18, wherein the page manager circuitry is further configured to:
prefetch a page from a page pool and store the prefetched page in a prefetch queue; and
cache a page pool descriptor for the prefetched page in the page pool descriptor cache.

20. The non-transitory computer readable storage medium of claim 18 wherein the page manager circuitry is further configured to:
receive a page reservation request for a set of processing work; and
reserve a requested number of pages in response to determining that a corresponding page pool includes a sufficient number of pages for the request;
wherein the circuit is configured to launch the set of processing work only after reservation of the requested number of pages by the page manager circuitry.

\* \* \* \* \*